July 29, 1958     J. C. BRUMFIELD     2,845,509
MOTOR OPERATED CIRCUIT BREAKER
Filed June 29, 1956     5 Sheets-Sheet 1

INVENTOR.
JOHN C. BRUMFIELD
BY Ostrolenk, Faber,
Gerb & Soffen
ATTORNEYS

July 29, 1958  J. C. BRUMFIELD  2,845,509
MOTOR OPERATED CIRCUIT BREAKER
Filed June 29, 1956  5 Sheets-Sheet 2
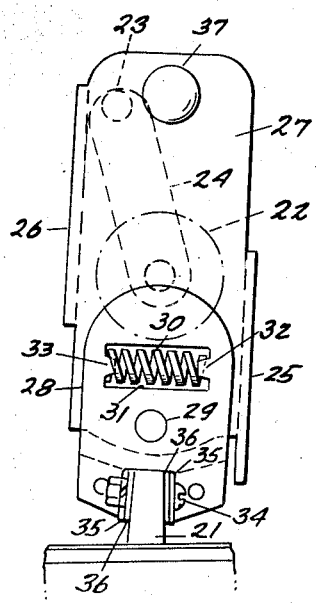
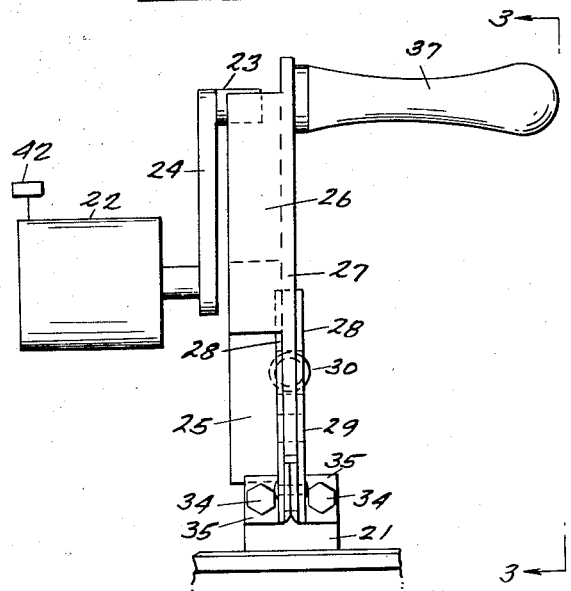
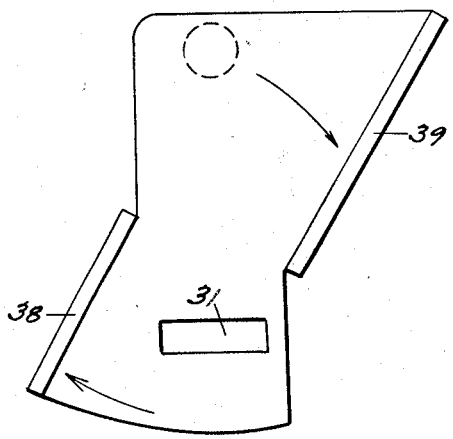
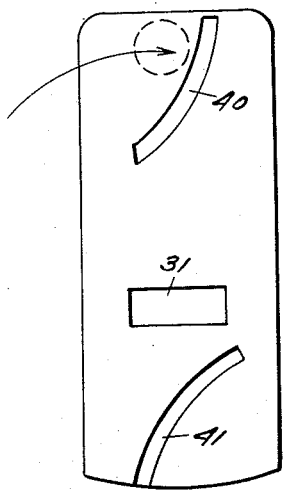
INVENTOR.
JOHN C. BRUMFIELD
BY Ostrolenk, Faber,
Gerb & Soffen
ATTORNEYS

ON POSITION
OFF IMPENDING

TRIPPED POSITION

RESET POSITION

OFF POSITION
ON IMPENDING

INVENTOR.
JOHN C. BRUMFIELD
BY Ostrolenk Faber,
Gerb & Soffen
ATTORNEYS

July 29, 1958 J. C. BRUMFIELD 2,845,509
MOTOR OPERATED CIRCUIT BREAKER
Filed June 29, 1956 5 Sheets-Sheet 4
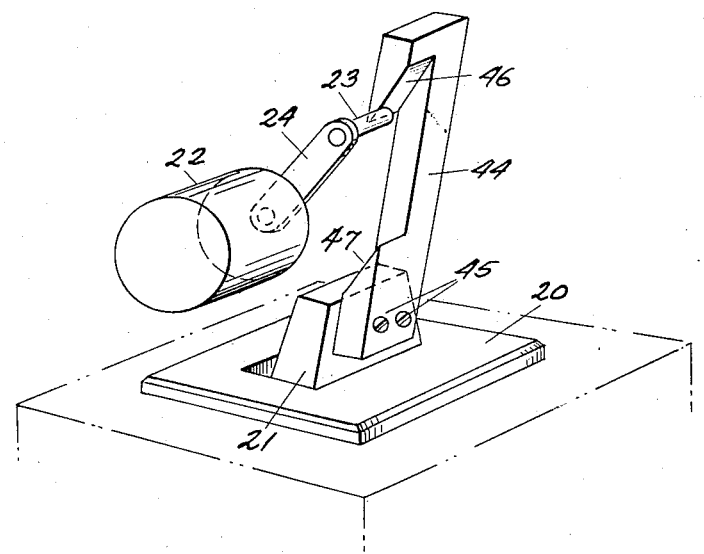
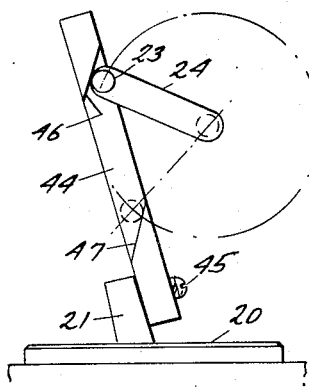
ON POSITION-
OFF IMPENDING
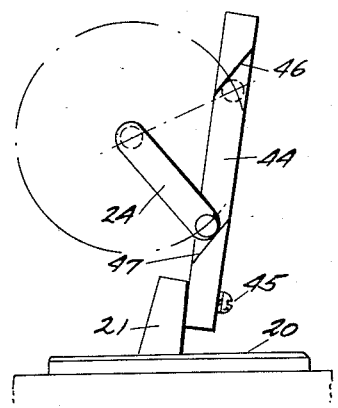
OFF POSITION-
ON IMPENDING
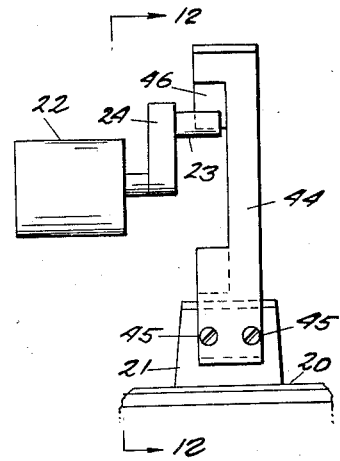
INVENTOR.
JOHN C. BRUMFIELD
BY Ostrolenk, Faber,
Gerb & Soffen
ATTORNEYS July 29, 1958  J. C. BRUMFIELD  2,845,509
MOTOR OPERATED CIRCUIT BREAKER
Filed June 29, 1956  5 Sheets-Sheet 5
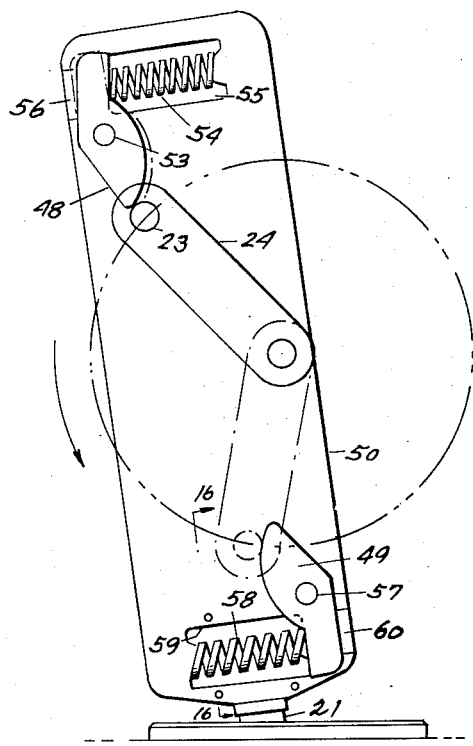
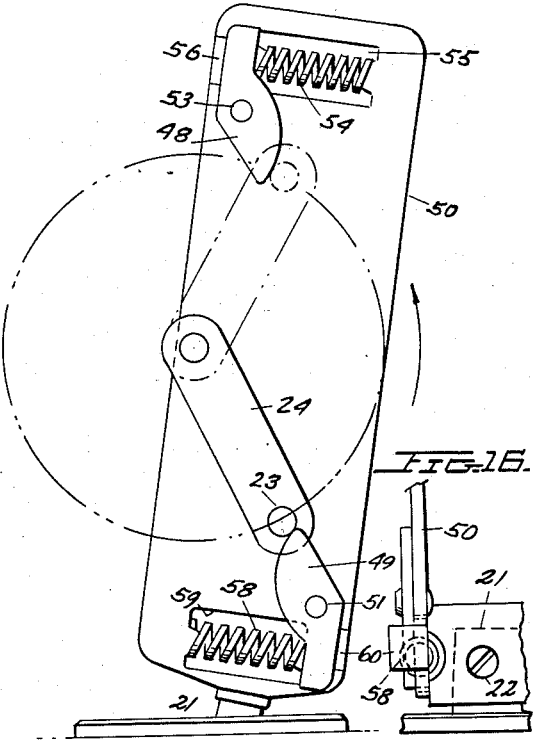
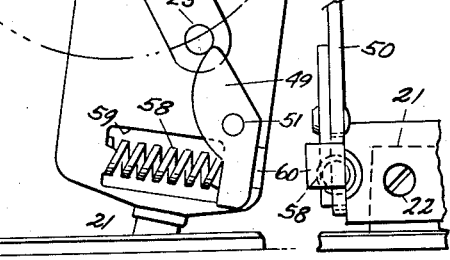
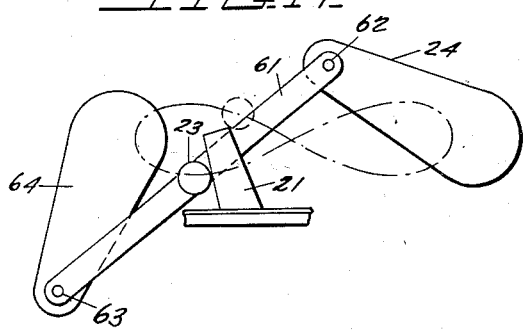
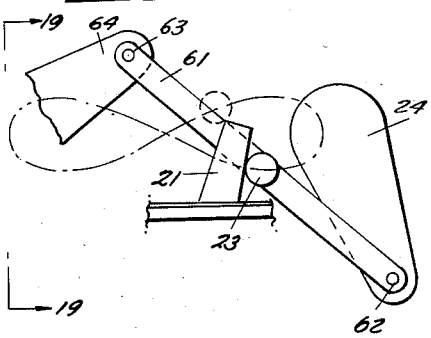
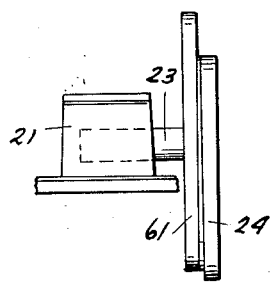
INVENTOR.
JOHN C. BRUMFIELD
BY
ATTORNEYS

# United States Patent Office 2,845,509
Patented July 29, 1958

2,845,509

MOTOR OPERATED CIRCUIT BREAKER

John C. Brumfield, Philadelphia, Pa., assignor to I-T-E Circuit Breaker Company, Philadelphia, Pa., a corporation of Pennsylvania Application June 29, 1956, Serial No. 594,880

15 Claims. (Cl. 200—92)

My invention relates to a motor operated mechanism for operating a circuit breaker handle and is based on my copending application Serial No. 517,593, filed June 23, 1955, and differs therefrom in the use of a uni-directional motor whereas the above application discloses a structure which actuates a mechanism by means of a reversible motor.

I have found that I can provide a linkage between a uni-directional motor and a circuit breaker handle which allows automatic disconnection between the circuit breaker handle and the uni-directional motor after operation of the circuit breaker handle to an extreme position.

One method of accomplishing the desired effect of operating a circuit breaker handle between extreme positions is, in accordance with my novel invention, to extend the circuit breaker handle and to drive an engaging means such as a roller in such a manner as to connect this roller to a first portion of the circuit breaker handle when driving the circuit breaker handle to one extreme position and to thereafter disconnect the roller and circuit breaker handle whereupon a continued rotation of the roller will bring the roller into reengagement with the circuit breaker handle at a second portion which may be radially displaced from the first portion to thereby allow driving of the circuit breaker handle to a second extreme position.

Furthermore, in the event that the circuit breaker operating handle is automatically moved to a trip position by means of its internal mechanism which may operate responsive to fault conditions, my novel motor operated mechanism which is driven by a uni-directional motor may then be actuated to automatically pick up the circuit breaker handle and drive it to the reset position. My novel linkage is further constructed so as to be automatically disconnected from the circuit breaker operating handle without causing breakage of this operating handle when it is moved to one of its extreme positions.

Accordingly, a primary object of my invention is to provide a motor operated mechanism for actuating circuit breaker contacts wherein the motor operated mechanism is energized from a uni-directional motor and is automatically disconnected from the circuit breaker after its contacts are moved to extreme positions.

Another object of my invention is to provide a motor operated mechanism for circuit breaker handles wherein manual operation of the circuit breaker handle is afforded without any alteration of the mechanism.

Still another object of my invention is to provide a motor operated mechanism for a circuit breaker handle such that continued rotation of the driving motor will not cause breakage of the circuit breaker handle or its associated mechanism after the circuit breaker handle is moved to an extreme position.

A further object of my invention is to provide a motor operated mechanism for circuit breaker handles which will give a visual indication of the circuit breaker handle being in a first or open position, a second or closed position, or a third or tripped position.

Still a further object of my invention is to provide a motor operated mechanism driven by the uni-directional motor which engages a circuit breaker handle extension at a first radial position to drive the circuit breaker handle to a first extreme position and to engage the circuit breaker handle extension at a second radial position to drive the circuit breaker handle to a second extreme position.

Another object of my invention is to provide a mechanism driven by a uni-directional motor which will force a means adapted to engage a circuit breaker handle in a figure 8 type of motion whereby motion in the first loop will drive the circuit breaker handle to a first extreme position and the return motion along the second loop will drive the circuit breaker handle to a second extreme position.

These and other objects of my invention will become apparent when taken in conjunction with the drawings, in which:

Figure 2 is a side view of the embodiment of Figure 1.

Figure 3 is a view of Figure 2 taken along the line 3—3 of Figure 2.

Figure 4 shows one possible variation of the cam plate of Figures 1, 2 and 3.

Figure 5 shows a second variation of the cam plate of Figures 1, 2 and 3.

Figure 10 shows a perspective view of a second embodiment of my novel invention.

Figure 11 shows a side view of the embodiment of Figure 10.

Figure 12 is a view of Figure 11 along the lines 12—12 of Figure 11 with the mechanism in an on position prior to being driven to an off position.

Figure 13 is similar to Figure 12 showing the mechanism in an off position prior to being driven to an on position.

Figure 14 shows a side view of still another embodiment of my invention which embodiment operates in accordance with the principles of the embodiments of Figures 1 through 13.

Figure 15 is similar to Figure 14, showing the position of the mechanism in the on position prior to being driven to an off position.

Figure 16 is a view taken along the lines 16—16 of Figure 14.

Figure 17 shows a still further embodiment of my novel invention wherein an operating roller is driven in a figure 8 type of motion wherein the figure shows a circuit breaker handle in the on position prior to being driven to an off position.

Figure 18 is similar to Figure 17 and shows the circuit breaker handle in an off position prior to being driven to an on position.

Figure 19 is a side view of Figure 18 when taken across the lines 19—19 of Figure 18.

Figure 1:
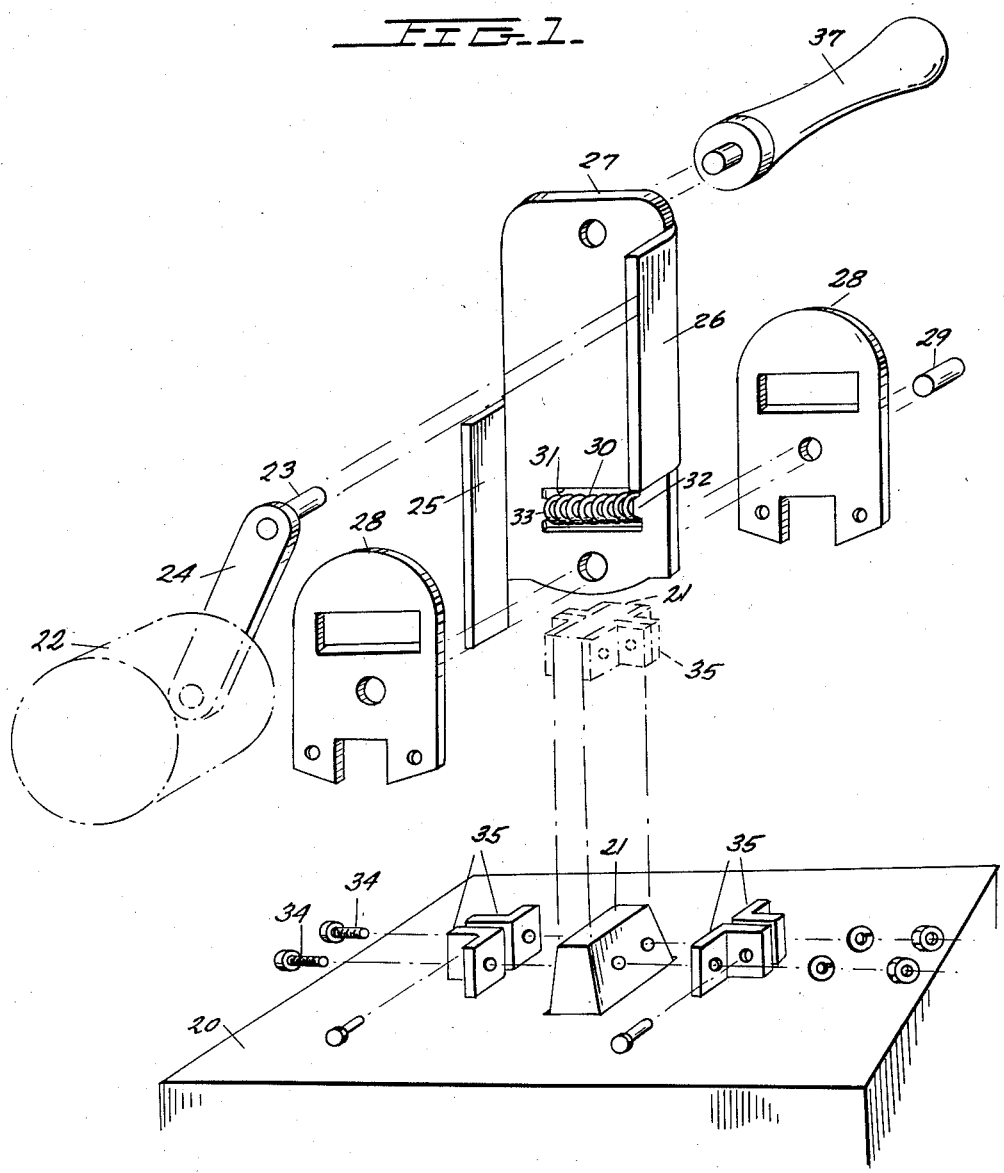
Figure 1 is an exploded perspective view of one embodiment of my invention.

Figure 1 shows a circuit breaker 20 which may be mounted in any desired manner having an operating handle 21 which is so adapted as to move between a first and second extreme position in operating the cooperating contacts of the circuit breaker 20. Circuit breaker 20 may, if desired, be of any commonly used type, wherein trip free mechanisms may be provided and maintaining means are utilized to maintain the cooperating contacts in the position to which they are driven by means of the operating handle 21.

It is to be understood that circuit breaker 20, being of the normal type, will be severely damaged by either breakage of the operating handle or breakage of the internal mechanism in the event that the operating handle 21 is driven beyond either of its extreme positions.

The operating mechanism of my novel invention may now be specifically described in conjunction with Figures 1, 2 and 3 wherein a uni-directional motor 22 is mounted in any desired manner with respect to circuit breaker 20 and is so adapted as to drive an engaging means such as the roller 23 by means of a crank arm 24. The roller 23 is so driven as to be engageable with cam surfaces 25 and 26 of cam plate 27. It is seen that these cam surfaces 25 and 26 are offset from one another so as to provide clearance of the roller 23 after engaging the opposite cam surface. The cam plate 27 is then mounted to a mounting assembly which is comprised of plates 28 by the pivotal mounting means for pin 29 and the cushion spring means 30 which is maintained in the aperture 31 by means of protrusions 32 and 33 of cam plate 27.

The mounting plates 28 are then secured to the operating handle 21 by the nut and bolt means 34 which passed through projections 35 of mounting plates 28. If desired, pressure plates such as plates 36 may be interposed between projections 35 and the operating handle 21.

An operating handle 37 for manual operation may then be fastened to the cam plate 27 as is specifically shown in Figure 2. It is to be noted that manual operation of the circuit breaker handle 21 is in view of my novel mechanism available at any time without any operation on the mechanism to allow this operation.

The cam surfaces 25 and 26 of the cam plate 27 have, in Figures 1, 2 and 3, been shown as simple off set projections of the cam plate 27. This cam plate 27, however, may take several other forms as may be seen in connection with Figures 4 and 5.

In the case of Figure 4, cam surface 38 will correspond to cam surfaces 25 of Figures 1, 2 and 3 and cam surface 39 will correspond to the cam surface 26 of Figures 1, 2 and 3. Similarly, in the case of Figure 5, cam surface 40 will correspond to the cam surface 26 of Figures 1, 2 and 3 whereas the cam surface 41 will correspond to the cam surface 25 of Figures 1, 2 and 3.

However, when utilizing the plates of either Figures 4 or 5 rather than the plate 27 of Figures 1, 2 and 3, the operation will follow in a substantially identical manner. The operation of my novel mechanism set forth in Figures 1 through 5 may now be understood with reference to Figures 6, 7, 8 and 9.

Figure 6:
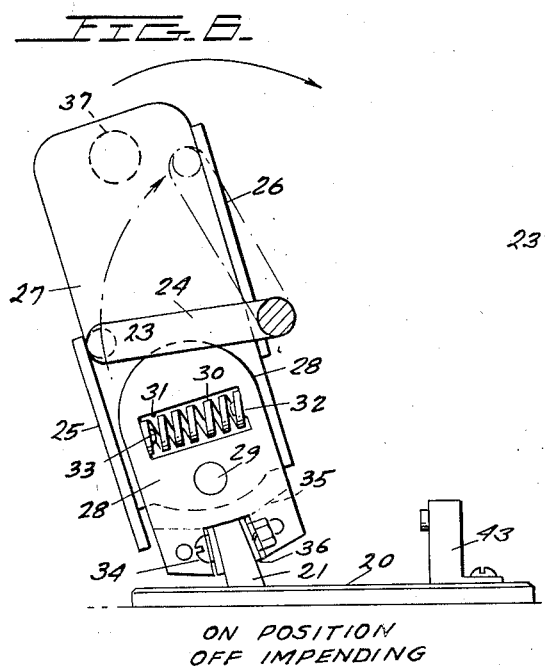
Figure 6 is similar to Figure 3 and shows the mechanism in the circuit breaker in an on position immediately prior to being driven to an off position.
Figure 8:
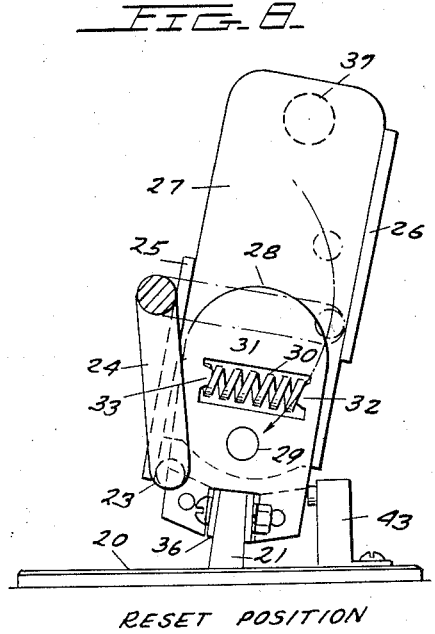
Figure 8 is similar to Figure 3 showing the mechanism in a reset position prior to being driven to an on position.
Figure 9:
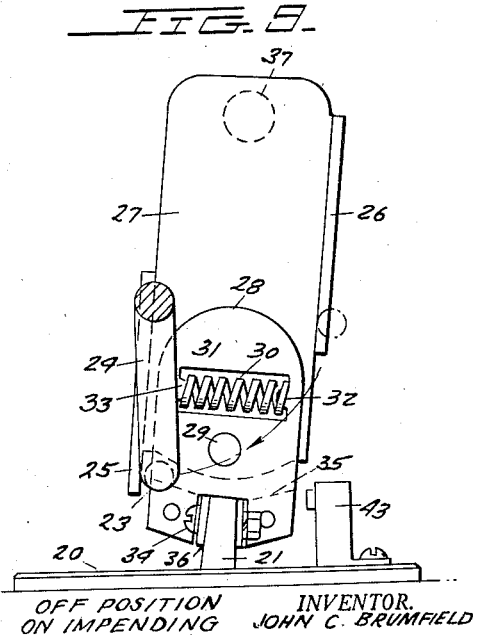
Figure 9 is similar to Figure 3 with the mechanism in the off position prior to being driven to the on position.

In Figure 6, the circuit breaker operating handle 21 is shown as being in an on position. Here the crank arm 24 is seen as positioning the roller 23 in the position shown in the solid line and it is clear that upon energization of the motor 22 by the energizing means 42 indicated schematically as a box and which may be of any well known type, the roller 23 will be rotated by crank arm 24 in the direction shown by the arrow in Figure 6 whereby the roller 23 will assume the dotted position in moving into engagement with the cam surface 26. Upon continued rotation of motor 22, it is clear that cam 23 will in driving against the cam surface 26, drive the operating handle 21 to the reset position of Figure 8. Since the reset position of Figure 8 is one extreme position of the operating handle 21, a continued rotation of crank arm 24 while the roller 23 is still in engagement with cam surface 26 will merely cause the cam plate 27 to rotate about the pivot point 29 against the biasing force of spring 30 until the roller 23 moves far enough to disengage the cam surface 26.

Once the circuit breaker operating handle 21 has been moved to its extreme position, it may be desirable that means be provided to automatically deenergize rotation of the motor 22. This may be accomplished by either having an operator open the energizing circuit when he sees that the circuit breaker has moved to the desired position or may be automatically done by positioning a limit switch 43 which may be so connected as to deenergize the motor 22 when the circuit breaker is moved to its extreme position. Similarly another limit switch could be positioned so as to be engaged by the circuit breaker operating handle 21 when this circuit breaker operating handle is moved to this on position to thereby prevent re-operation of the circuit breaker to an off position.

Figure 7:
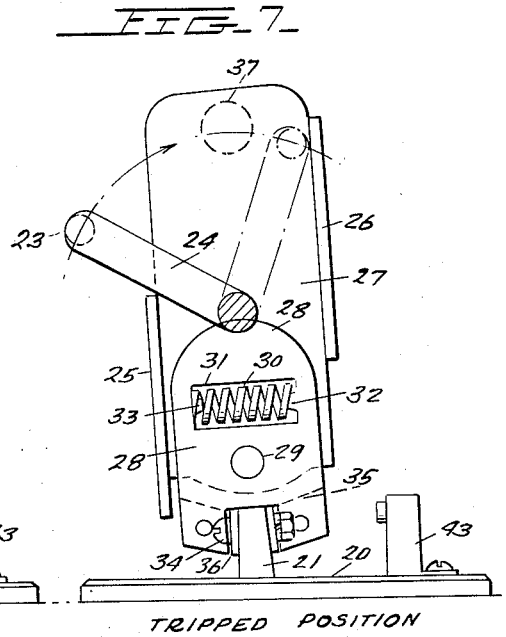
Figure 7 is similar to Figure 3 in showing the mechanism in a tripped position prior to being driven to a reset position.

In the event that the circuit breaker handle 21 is moved to a tripped position due to a fault condition on the line protected by the circuit breaker, it is seen in Figure 7 that energization of motor 22 will drive crank arm 24 from the solid position of Figure 7 to the dotted position of Figure 7 to subsequently cause roller 23 to drive cam surface 26 in the same manner as was described in connection with Figure 6. When the circuit breaker operating handle 21 is in the reset or off position and it is desired to drive the operating handle 21 to an on position, then energization of the motor 22 will, in the case of Figures 8 and 9, drive the crank arm 24 from the solid position shown in these figures to the dotted position of Figures 8 and 9 to bring roller 23 into engagement with cam surface 25. Clearly a continued rotation of crank arm 24 will cause the roller 23 to drive the cam plate 27 to the left whereby the operating handle 21 will be driven to its extreme left hand or on position.

When the circuit breaker handle 21 finally assumes this extreme left hand position, continued rotation of the crank arm 24 will once again cause cam plate 27 to pivot about its pivot point 29 against the biasing force of spring 30 until the roller 23 finally disengages the cam surface 25.

Several features are to be noted in conjunction with the operation set forth above wherein the uni-directional motor is connected to the operating handle extension at different radial positions with respect to the operating handle. The first is that an extremely simple linkage is provided to connect and disconnect a uni-directional motor to circuit breaker operating handle after the circuit breaker operating handle is moved to an extreme position.

Secondly, the mechanism is so constructed as to allow a manual operation by means of the operating handle 37 without disconnecting any of the operating mechanism. Similarly, a visual indication of the position of the operating handle is always available.

Figure 10 shows a perspective view of a second embodiment of my invention which operates in accordance with the features set forth in the embodiment of Figures 1 through 9. Figure 10 and Figure 11 which is a side view of Figure 10 show the operating handle 21 as being fastened to a cam plate 44 which is attached to the operating handle 21 by the screw means 45. This cam plate is then provided with cam surfaces 46 and 47 wherein cam surface 46 is positioned at a greater radial distance from operating handle 21 than is cam surface 47. The roller 23 which is driven by crank arm 24 then engages the cam surfaces 46 and 47 in the same manner as was described in conjunction with the embodiments of Figures 1 through 9.

This operation may be seen in conjunction with Figures 12 and 13 where, in Figure 12, circuit breaker operating handle 21 is in the on position and the crank arm 24 is in the solid position of Figure 12. When it is desired to drive the operating handle 21 to the off position of Figure 13, then the uni-directional motor 22 is energized, in this case for a counterclockwise rotation, to bring the roller 23 into engagement with cam surface 47 and to thereafter drive the operating handle 21 to the position of Figure 13. Cam surface 47 is, as may be seen in Figure 13, cut at such an angle that upon movement of circuit breaker handle 21 to its extreme right hand position, the cam roller 23 will move tangentially with respect to the cam surface 47 to thereby be disengaged therefrom upon continued rotation. The energization of the motor after movement of the circuit breaker handle 21 to its extreme right hand position may be stopped by limit switches in a manner similar to that described in conjunction with Figure 6.

If now it is desired to drive the circuit breaker operating handle 21 from the off position of Figure 13 to the on position of Figure 12, then it is clear that motor 22 only needs to be energized to thereby bring roller 23 from the solid position of Figure 13 to the dotted position of Figure 13 whereupon continued counterclockwise rotation will drive the circuit breaker handle to the left and the roller 23 will then subsequently move tangentially to the cam surface 46 and be disengaged therefrom.

A variation of the embodiment of Figures 10 through 13 is seen in conjunction with Figures 14, 15 and the side view of Figure 16, in which the cam surfaces 46 and 47 of Figures 10 through 13 are replaced by the resiliently mounted fingers 48 and 49 respectively of Figures 14, 15 and 16.

Referring now to Figures 14, 15 and 16, it is seen that the circuit breaker operating handle 21 is connected to the plate 50 by means of the member 51 which is fastened to the circuit breaker operating handle 21 by the screw means 52. Resiliently mounted member or finger 48 is pivotally mounted at pivot point 53 and is biased in the case of Figure 14 in a counterclockwise direction by means of the compression spring 54 which is held within opening 55 of plate 50. Plate 50 is further provided with a stop 56 which limits the counterclockwise position of the finger 48.

The assembly of the resiliently mounted finger 49 is similar to that of finger 48 and comprises the pivot point 57, spring 58 mounted within aperture 59 and the stop 60. Once again, a uni-directional motor is so positioned as to drive the crank arm 24 having a roller 23 thereon into engagement with the flexibly mounted fingers 48 and 49.

In the case of Figure 14, the circuit breaker operating handle 21 is shown as being in a reset position immediately prior to being driven to an on position, the finger 48 being in the dotted position and the crank arm 24 being in the solid position. Upon energization of the motor 22, crank arm 24 will rotate in a counterclockwise direction to the dotted position of Figure 14 to thereby engage flexibly mounted finger 49. Upon so engaging finger 49, the compression spring 58 will provide sufficient flexibility to allow the plate 50 to drive operating handle 21 to the right hand or on position of Figure 15.

When the circuit breaker handle 21 assumes this extreme right hand position, its motion is rigidly stopped and continued rotation of the crank arm 24 will cause flexibly mounted finger 49 to compress spring 58 in rotating about the pivot point 57 until the roller 23 disengages the cam surface of finger 49.

In a like manner, energization of motor 22 when the circuit breaker operating handle is in the on position of Figure 14 will cause the crank arm 24 to drive from the solid position of Figure 15 to the dotted position of Figure 14 to thereby engage the cam surface of finger 48 and subsequently drive plate 50 which is connected to operating handle 21 to a left hand or off position. Upon continued rotation of the crank arm 24, the compression spring 54 will compress to thereby allow a clockwise rotation of finger 48 about pivot point 53 to thereby allow a subsequent disengagement between the roller 23 and the finger 48.

In the embodiment of Figures 14, 15 and 16, it will be noted that limit switches such as the limit switch 43 of Figure 6 may be provided to cause automatic deenergization of motor 22 when the circuit breaker operated handle 21 is moved to an extreme position. Similarly, the above noted structure of Figures 14, 15 and 16 will afford all of the advantages cited in connection with the embodiments of Figures 1 through 9 and 10 through 13.

A still further embodiment of my novel invention may be seen in conjunction with Figures 17, 18 and 19, in which a mechanism is so constructed as to be driven from a uni-directional motor to move a roller or engaging means in a figure 8 type of motion. In Figures 17, 18 and 19, the circuit breaker operating handle 21 is positioned to be engaged by roller 23 which is mounted on drive bar 61.

The drive bar 61 is then supported between pivot point 62 of crank arm 24 and the pivot point 63 of idler arm 64. Crank arm 24 is connected to be driven by a motor in the same manner as has been previously set forth. The crank arm 24, idler arm 64 and drive bar 61 are so constructed as to impart the figure 8 type of motion as shown in the dot-dash line to the roller 23 responsive to a unidirectional clockwise rotation of the crank arm 24. Hence when the circuit breaker operating handle 21 is in the on position of Figure 17, and it is desired to drive operating handle 21 to the off position of Figure 18, then a rotation of crank arm 24 in a clockwise direction will cause the roller 23 to move to the dotted position of Figure 18, thereby driving crank breaker handle 21 to the extreme right hand position and subsequently moving out of engagement therewith.

If desired, limiting means such as seen in conjunction with Figure 6 may be utilized in connection with Figures 17, 18 and 19, to deenergize rotation of crank arm 24 at this point.

If now, it is desired to subsequently move the operating handle 21 from the off position of Figure 18 to the on position of Figure 17, then the crank arm 24 is merely reenergized to continue its unidirectional rotation, whereupon the roller 23 is moved to the position of Figure 18 to subsequently drive operating handle 21 to the left hand position of Figure 17.

At this point, the roller 23 will be in the dotted position of Figure 17 and a continued motion thereof in its figure 8 type of motion will effect a disengagement between the roller 23 and the operating handle 21.

Although I have here described preferred embodiments of my invention, many variations and modifications will now become apparent to those skilled in the art and I therefore prefer to be limited, not by the disclosure herein, but only by the appended claims.

I claim:

1. A mechanism for operating a circuit breaker having an operating handle which is movable in a first plane between a first and a second position, said mechanism comprising a unidirectional motor and a connecting means; said connecting means being constructed to operatively connect said unidirectional motor to said operating handle for motion thereof to said first position responsive to a first rotation of said unidirectional motor and to said second position responsive to a second rotation of said unidirectional motor; said connecting means being constructed to be automatically released from said operating handle after said operating handle is moved into said first or second position; said connecting means being movable in a plane substantially parallel to said first plane.

2. A mechanism for operating a circuit breaker having an operating handle which is pivotable about a point and movable between a first and a second position; said mechanism comprising a unidirectional motor and a connecting means; said connecting means being constructed to operatively connect said unidirectional motor to said operating handle for motion thereof to said first position responsive to a first rotation of said unidirectional motor and to said second position responsive to a second rotation of said unidirectional motor; said connecting means being constructed to be automatically released from said operating handle after said operating handle is moved into said first or second position; said unidirectional motor being connected to said operating handle at a first radial portion during said first rotation of said unidirectional motor and at a second radial portion during said second rotation of said unidirectional motor; said first and second radial portions being operatively positioned at different distances from said point.

3. A mechanism for operating a circuit breaker having an operating handle which is movable in a first plane between a first and a second position; said mechanism comprising a unidirectional motor having an output shaft and linkages for connecting said output shaft to said operating handle; said linkages being constructed to operatively connect said output shaft to a first portion of said operating handle when said output shaft rotates for a first portion of a cycle and to operatively connect said output shaft to a second portion of said operating handle when said output shaft rotates over a second portion of said cycle; said operating handle being moved to said first position responsive to rotation of said output shaft in said first portion of a cycle and to said second position when said output shaft is rotated in said second portion of said cycle; said output shaft being substantially perpendicular to said first plane.

4. A mechanism for operating a circuit breaker having an operating handle which is movable between a first and a second position; said mechanism comprising a unidirectional motor having an output shaft and linkages for connecting said output shaft to said operating handle; said linkages being constructed to operatively connect said output shaft to a first radial portion of said operating handle when said output shaft rotates for a first portion of a cycle and to operatively connect said output shaft to a second radial portion of said operating handle when said output shaft rotates over a second portion of said cycle; said operating handle being moved to said first position responsive to rotation of said output shaft in said first portion of a cycle and to said second position when said output shaft is rotated in said second portion of said cycle; said first and second radial portions being operatively positioned at different distances from said output shaft.

5. A mechanism for operating a circuit breaker having an operating handle which is movable in a first plane between a first and a second position; said mechanism comprising a unidirectional motor having an output crank arm; said output crank arm being positioned to operatively engage a first portion of said operating handle when said crank arm rotates through a first portion of its cycle and to thereafter disengage said operating handle and to operatively engage a second portion of said operating handle when said crank arm rotates through a second portion of its cycle and to thereafter disengage said operating handle; said operating handle being moved to said first position responsive to rotation of said output shaft in said first portion of a cycle and to said second position when said output shaft is rotated in said second portion of said cycle; said crank arm being rotatable in a second plane substantially parallel to said first plane.

6. A mechanism for operating a circuit breaker having an operating handle which is movable between a first and a second position; said mechanism comprising a unidirectional motor having an output crank arm; said output crank arm being positioned to operatively engage a first radial portion of said operating handle when said crank arm rotates through a first portion of its cycle and to thereafter disengage said operating handle and to operatively engage a second radial portion of said operating handle when said crank arm rotates through a second portion of its cycle and to thereafter disengage said operating handle; said operating handle being moved to said first position responsive to rotation of said output shaft in said first portion of a cycle and to said second position when said output shaft is rotated in said second portion of said cycle; said first and second radial portions being operatively positioned at different distances from said crank arm center of rotation.

7. A mechanism for operating a circuit breaker having an operating handle which is movable in a first plane between a first and second position; said mechanism comprising a unidirectional motor having an output crank arm and a connecting means having a first and second engaging means; said connecting means being connected to said operating handle; said first engaging means being positioned to removably engage said crank arm during rotation of said crank arm in a first portion of its cycle and said second engaging means being positioned to removably engage said crank arm during rotation of said crank arm in a second portion of its cycle; said crank arm being rotatable in a second plane substantially parallel to said first plane.

8. A mechanism for operating a circuit breaker having an operating handle which is movable between a first and second position; said mechanism comprising a unidirectional motor having an output crank arm and a connecting means having a first and second engaging means; said connecting means being resiliently connected to said operating handle; said first engaging means being positioned to removably engage a first part of said crank arm during rotation of said crank arm in a first portion of its cycle and said second engaging means being positioned to removably engage said first part of said crank arm during rotation of said crank arm in a second portion of its cycle; said operating handle being moved to said first position responsive to engagement of said crank arm and said first engaging means and to said second position responsive to engagement of said crank arm and said second engaging means.

9. A mechanism for operating a circuit breaker having an operating handle which is movable between a first and second position; said mechanism comprising a unidirectional motor having an output crank arm and a connecting means having a first and second engaging means; said connecting means being connected to said operating handle; said first engaging means being positioned to removably engage said crank arm during rotation of said crank arm in a first portion of its cycle and said second engaging means being positioned to removably engage said crank arm during rotation of said crank arm in a second portion of its cycle; said first and second engaging means being positioned at different radial distances from said operating handle.

10. A mechanism for operating a circuit breaker having an operating handle which is movable between a first and second position; said mechanism comprising a unidirectional motor having an output crank arm and a cam plate having a first and second cam surface; said cam plate being connected to said operating handle; said first cam surface being positioned to removably engage a first part of said crank arm during rotation of said crank arm in a first portion of its cycle and said second cam surface being positioned to removably engage a first part of said crank arm during rotation of said crank arm in a second portion of its cycle.

11. A mechanism for operating a circuit breaker having an operating handle which is movable between a first and second position; said mechanism comprising a unidirectional motor having an output crank arm and a cam plate having a first and second cam surface; said cam plate being connected to said operating handle; said first cam surface being positioned to removably engage said crank arm during rotation of said crank arm in a first portion of its cycle and said second cam surface being positioned to removably engage said crank arm during rotation of said crank arm in a second portion of its cycle; said first and second engaging means being positioned at different radial distances from said operating handle.

12. A mechanism for operating a circuit breaker having an operating handle which is movable in a first plane between a first and second position; said mechanism comprising a unidirectional motor having an output crank arm and a cam plate having a first and second cam surface; said cam plate being resiliently connected to said operating handle; said first cam surface being positioned to removably engage said crank arm during rotation of said crank arm in a first portion of its cycle and said second cam surface being positioned to removably engage said crank arm during rotation of said crank arm in a second portion of its cycle; said operating handle being moved to said first position responsive to engagement of said crank arm and said first engaging means and to said second position responsive to engagement of said crank arm and said second engaging means; said crank arm being rotatable in a second plane substantially parallel to said first plane.

13. A mechanism for operating a circuit breaker having an operating handle which is movable between a first and second position; said mechanism comprising a unidirectional motor having an output crank arm and a connecting means having a first and second engaging means; said connecting means being connected to said operating handle; said first engaging means being positioned to removably engage said crank arm during rotation of said crank arm in a first portion of its cycle and said second engaging means being positioned to removably engage said crank arm during rotation of said crank arm in a second portion of its cycle; said first engaging means being a first resiliently mounted finger; said second engaging means being a second resiliently mounted finger.

14. A mechanism for operating a circuit breaker having an operating handle which is movable between a first and second position; said mechanism comprising a unidirectional motor and linkage for moving an engaging means through a figure 8 motion responsive to unidirectional rotation of said motor; said engaging means being positioned to removably engage said operating handle and move said operating handle to said first position when said engaging means moves through a first loop of said figure 8 motion and to removably engage said operating handle and move said operating handle to said second position when said engaging means moves through the second loop of said figure 8 motion.

15. A mechanism for operating a circuit breaker having an operating handle which is movable between a first and second position; said mechanism comprising a unidirectional motor and linkage for moving an engaging means through a figure 8 motion responsive to unidirectional rotation of said motor; said linkage comprising a crank arm driven by said motor; a pivotally mounted idler arm and a drive bar pivotally supported between said crank arm and said idler arm; said engaging means being mounted on said drive bar; said engaging means being positioned to removably engage said operating handle and move said operating handle to said first position when said engaging means moves through a first loop of said figure 8 motion and to removably engage said operating handle and move said operating handle to said second position when said engaging means moves through the second loop of said figure 8 motion.

References Cited in the file of this patent

UNITED STATES PATENTS

| | | |
|---|---|---|
| 1,701,398 | Vickery | Feb. 5, 1929 |
| 1,726,964 | Olley | Sept. 3, 1929 |
| 1,789,057 | Vickery | Jan. 13, 1931 |
| 1,924,351 | Doddridge | Aug. 29, 1933 |
| 2,192,046 | Lindstrom | Feb. 27, 1940 |
| 2,410,253 | Trogner | Oct. 29, 1946 |
| 2,430,367 | Pudelko et al. | Nov. 4, 1947 |